(12) United States Patent
Boger

(10) Patent No.: US 6,326,935 B1
(45) Date of Patent: Dec. 4, 2001

(54) METHOD AND APPARATUS FOR CHANGING THE MODE OF A DISPLAY APPARATUS

(75) Inventor: Robert A. Boger, Sioux City, IA (US)

(73) Assignee: Gateway, Inc., N. Sioux City, SD (US)

(*) Notice: Subject to any disclaimer, the term of this patent is extended or adjusted under 35 U.S.C. 154(b) by 0 days.

(21) Appl. No.: 09/406,931

(22) Filed: Sep. 28, 1999

(51) Int. Cl.[7] ............................................. G09G 5/00
(52) U.S. Cl. ............................ 345/3.2; 345/12; 348/552; 348/555
(58) Field of Search ..................... 345/132, 3.2, 12; 348/552, 555, 558

(56) References Cited

U.S. PATENT DOCUMENTS

| | | |
|---|---|---|
| 4,425,581 * | 1/1984 | Schweppe et al. . |
| 5,070,395 * | 12/1991 | Kitaura et al. . |
| 5,537,114 * | 7/1996 | Faris ........................................ 348/58 |
| 5,675,390 * | 10/1997 | Schindler .............................. 348/552 |
| 6,046,721 * | 4/2000 | Song et al. . |

* cited by examiner

*Primary Examiner*—Jeffery Brier
(74) *Attorney, Agent, or Firm*—Kenneth J. Cool; William J. Breen, III; Suiter & Associates, PC

(57) ABSTRACT

A display apparatus and computer system employing the same comprise a dual mode television/monitor display which is operable to provide television display output in an interlaced mode of operation and computer output in a noninterlaced computer graphics mode of operation a visually detectable manner and further comprises a communication channel for transmitting commands from the host computer system to the display apparatus. The display apparatus contains a microprocessor for receiving commands from the host computer system for switching the display between the interlaced and noninterlaced modes of operation. In a further aspect, a method of transitioning the dual mode display between the television and computer graphics modes of operation via a host computer system is provided.

27 Claims, 7 Drawing Sheets

METHOD AND APPARATUS FOR CHANGING THE MODE OF A DISPLAY APPARATUS

FIELD OF THE INVENTION

The present invention relates generally to computer systems and, more particularly, to display devices for use with computer systems such as personal computer systems.

BACKGROUND OF THE INVENTION

Personal computer systems, such as IBM personal computer systems, have attained widespread use. Historically, such systems have been information handling systems designed primarily to give independent computing power to a single user (or a relatively small group of users in the case of personal computers which serve as computer server systems).

Convergence products are now beginning to form a relatively new categomy of entertainment products, based on the convergence of personal computer (PC) technology and traditional consumer electronics technology. With this trend towards convergence, or using a personal computer with a large monitor as the heart an entertainment system, it is likely that standards will eventually be developed to assure the compatibility and interoperability of products. However, conventional interlaced television (broadcast and cabled) is still currently a widespread viable medium. Even if such standards are eventually developed, there will exist a very large number of "legacy" consumer electronic devices that users may wish to continue using, along with a large number of existing articles containing analog video information in well-established formats. Therefore, even if a computer is employed in an entertainment system, it is likely that users will wish to continue to view conventional (interlaced) video from sources such as broadcast and cabled television, inputs from other analog video sources such as videotape recorders (VTRs), laser disk players, video camcorder devices, and so forth.

It is known to receive an interlaced video source and convert it to a noninterlaced VGA format for display on a computer monitor. In so doing, it is also known to switch the monitor between an overscanned "TV mode" with increased brightness and altered color temperature for employing a computer monitor to view television content, and an underscanned "computer graphics mode" which generally has decreased brightness and sharper focus for viewing computer graphics content. However, even in television mode, the interlaced signal is not displayed directly, but is converted to a VGA signal.

Combination television/computer monitors are also known which are capable of displaying both a VGA (noninterlaced) signal and which further contain standard television tuning electronics. Although such devices may be interfaced to a computer, they are switched between the television and computer graphics modes only via the television-user interface, i.e., buttons or switches on the television itself or via a remote control television interface. Similarly, once the television mode has been selected, there does not exist any method for controlling the traditional television features, such as channel selection, via the host computer. Therefore, there exists a need for a system and method for switching between the computer (noninterlaced) and television (interlaced) modes of such TV/monitor hybrid displays from a host computer system interface. There also exists a need for a method and system for controlling traditional television features from a host computer system interface.

SUMMARY OF THE INVENTION

In one aspect, the present invention provides a display apparatus for use with a host computer system, wherein the display apparatus is of the type capable of a television (interlaced) mode of operation mode and a computer (noninterlaced) mode of operation. Displays capable of both types of operation are generally known in the art. As used herein, the terms television mode and interlaced mode will refer to an interlaced mode of display operation with any other modifications for optimizing the viewing of a television signal, such as overscanning, increasing brightness, changing the color temperature, and so forth. As used herein, the terms computer graphics mode and noninterlaced mode refer to a progressively scanned computer graphics mode of operation which is typically underscanned and generally is less blight and more sharply focused than the television mode of operation.

The display apparatus according to the present invention comprises a screen which is operable to display in a visually detectable manner output from the host computer system when operating in the interlaced mode of operation and which is further operable to display a television compatible signal such as an NTSC signal when operating in the noninterlaced mode of operation. The display apparatus further comprises a communication channel for transmitting commands from the host computer system to the display apparatus. The display apparatus contains a microprocessor for receiving commands from the host computer system, the microprocessor comprising control logic for switching the display between the interlaced and noninterlaced modes of operation.

In one embodiment, the communication channel between the display apparatus and the host system also allows the host system to control, in addition to the display mode, additional TV functions, such as changing channels, selecting a video source, making volume and picture adjustments, and so forth.

In another aspect, the present invention provides a computer system comprising a host computer system which comprises a processor, a memory coupled to the processor, a video controller coupled to the processor and memory, and the video display apparatus in accordance with the present invention as described herein.

In another aspect, the present invention provides a method of operating a computer system to control a display apparatus, the display apparatus coupled to a video controller of a host computer system. The computer system and display apparatus are coupled via a communication channel and the display apparatus comprises circuitry providing a first mode of operation and a second mode of operation, wherein the first mode of operation is one of an interlaced mode of operation and a noninterlaced mode of operation and wherein the second mode of operation is the other. The method according to the present invention comprises operating the display in the first display mode, receiving user input to change the display mode from the first mode to the second mode, sending a mode change command to the display apparatus in response to user input, and transitioning the display apparatus from the first mode to the second mode of operation.

In yet another aspect, the present invention provides a display apparatus capable of operation in both a television mode and a computer graphics mode and further operable to output an analog video signal to a host computer system when operating in the computer graphics mode. The host system is operable to send a command to switch the display between the television and computer graphics modes and the host system further comprises processing circuitry to digitize the analog video material and to display it in an overlay window as a part of the host system's computer graphics mode output.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
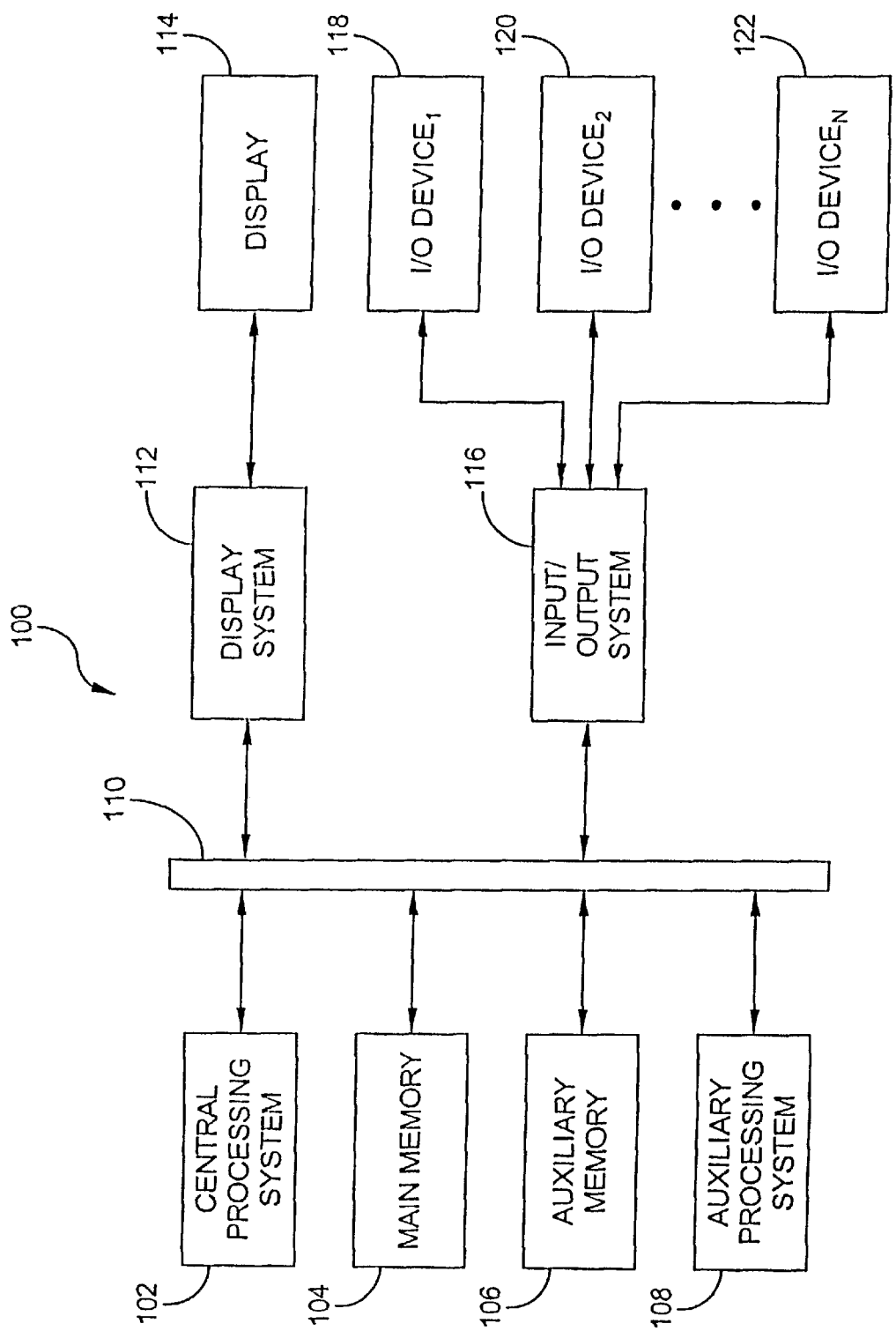
FIG. 1 is a block diagram illustrating a hardware system in accordance with the present invention.

Referring now to FIG. 1, a hardware system in accordance with the present invention is shown. The hardware system 100 shown in FIG. 1 is generally representative of the hardware architecture of a computer-based information handling system of the present invention. The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, and auxiliary memory 106. The hardware system 100 may further include an auxiliary processing system 108 as required. The main memory 104 provides storage of instructions and data for programs executing on the central processing system 102. The main memory 104 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and so on. The auxiliary memory 106 provides storage of instructions and data that are loaded into the main memory 104 before execution. The auxiliary memory 106 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 106 may also include a variety of nonsemiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 100 may optionally include an auxiliary processing system 108 which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 100 further includes a display system 112 for connecting to a display device 114, and an input/output (I/O) system 116 for connecting to one or more I/O devices 118, 120, up to N number of I/O devices 122. The display system 112 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like.

The display device 114 is a display capable of operating in a television mode and a computer graphics mode, and which is capable of receiving and executing commands received by hardware system 100. By television mode is meant an operational mode wherein a standard interlaced television signal is received and displayed. By computer graphics mode is meant an operational mode wherein a noninterlaced or progressively scanned output from display system 112 is received and displayed. Display 114 may comprise a cathode ray-tube (CRT) type display, or may comprise an alternative type of display technology such as a projection display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth.

The input/output system 116 may comprise one or more controllers or adapters for providing interface functions between the one or more I/O devices 118–122. For example, the input/output system 116 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 116 and I/O devices 118–122 may provide or receive analog or digital signals for communication between the hardware system 100 of the present invention and external devices, networks, or information sources. The input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

In an embodiment, the hardware system 100 forms the heart of a computer-based entertainment system or what is known as a PC-TV or a convergence system, so named because such systems represent the convergence of computer and consumer electronics into a single system. An exemplary entertainment system is described in commonly assigned U.S. Pat. No. 5,675,390, which is incorporated herein by reference in its entirety.

Figure 2:
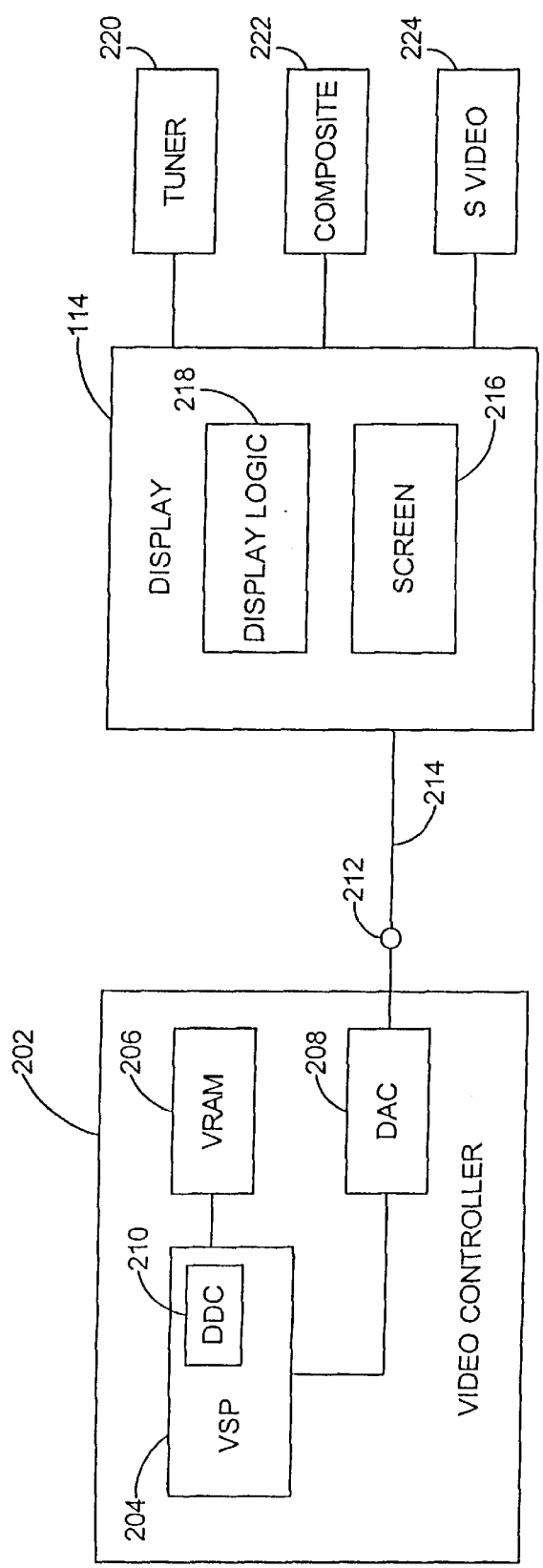
FIG. 2 is a block diagram illustrating a display apparatus according to the present invention in further detail.

The display system 112 (FIG. 1) and display 114 (FIG. 1) are shown in further detail in FIG. 2. Video controller 202 is coupled to bus 110 (FIG. 1) and includes video signal processor (VSP) 204, video ram (VRAM) 206 and digital-to-analog converter (DAC) 208. Video signal processor 204 includes display data channel (DDC) port 210. Video signal processor 204 is coupled to VRAM 206 and to digital-to-analog converter 208. Digital to analog converter is coupled to display connector 212. Display 114 is a computer display device capable of conforming to both a computer display standard and a television display standard. By computer display standard is meant display output conforming to, for example, the video graphics array (VGA) standard, super video graphics array (SVGA) standard, or other graphics-mode standards, resolutions, and so forth. Display 114 is coupled to display connector 212 via display cable 214. Display 114 includes screen 216 on which video information is presented. Display 114 further comprises a microprocessor or microcontroller 218 to provide standard digital monitor controls to control, for example, brightness, contrast, vertical and horizontal sizing and positioning, on/off (rest/resume), refresh rate, resolution, color temperatures. The control information may be input by one or more of user-accessible manual controls (e.g., a push-button control panel), a remote control unit (e.g., IR, RF, cabled, and so forth) operable to control the display, and circuitry for receiving control information from the personal computer via display cable 214 (e.g., via an operating system extension, standard PC utility, display-specific utility, and so forth).

The DDC interface conforms to a bidirectional DDC standard, for example, DDC2B, DDC2B+, DDC2AB. As will be recognized, the DDC2B and DDC2B+ modes use Inter-Integrated Circuit ($I^2C$) based communication and use pins on the VGA connector 212 so that no additional connector is needed between video controller 202 and display. It will also be recognized that the DDC2AB mode is based on the ACCESS.bus and requires a separate connector (not shown).

Although the present invention is described herein primarily by way of reference to DDC standards, it is contemplated that systems not implementing a DDC standard may also be adapted to provide a communication link between a host system and a display. For example, display mode change commands may be sent to a monitor over pins on a standard display connector that are unused or over an available data port, such as a serial port, parallel port, and so forth.

The television signal will typically be in one of the three major formats, i.e., NTSC, PAL, or SECAM, and, within the U.S., most preferably NTSC (National Television System Committee), the video standard presently used in the United States. NTSC employs interlace scanning at a rate of 30 frames per second (field frequency of 60 Hz), with 525 lines per frame and an image format of 4:3. Standards used outside the U.S., PAL (Phase Alteration by Line) and SECAM (Séquential à Mémoire), employ interlace scanning at a rate of 25 frames per second (field frequency of 50 Hz), with 625 lines per frame.

When the operational mode of display 114 is changed from the noninterlaced computer graphics mode to the interlaced television mode, the video signal output of video controller 202 is no longer displayed on screen 216 of display 114. In one embodiment, a video signal is not output by video controller 202 when the display 114 is operating in television mode. In television mode, a conventional interlaced television signal from a user selectable source including but not limited to a broadcast or cabled television signal received via tuner/antenna 220, a composite signal source 222 such as output from a video tape recorder (VTR), laser disk players, or video camera, etc., a separated video (S-video) source 224 as may be output by some laser disk players, VTRs, video cameras, and so forth.

Figure 3:
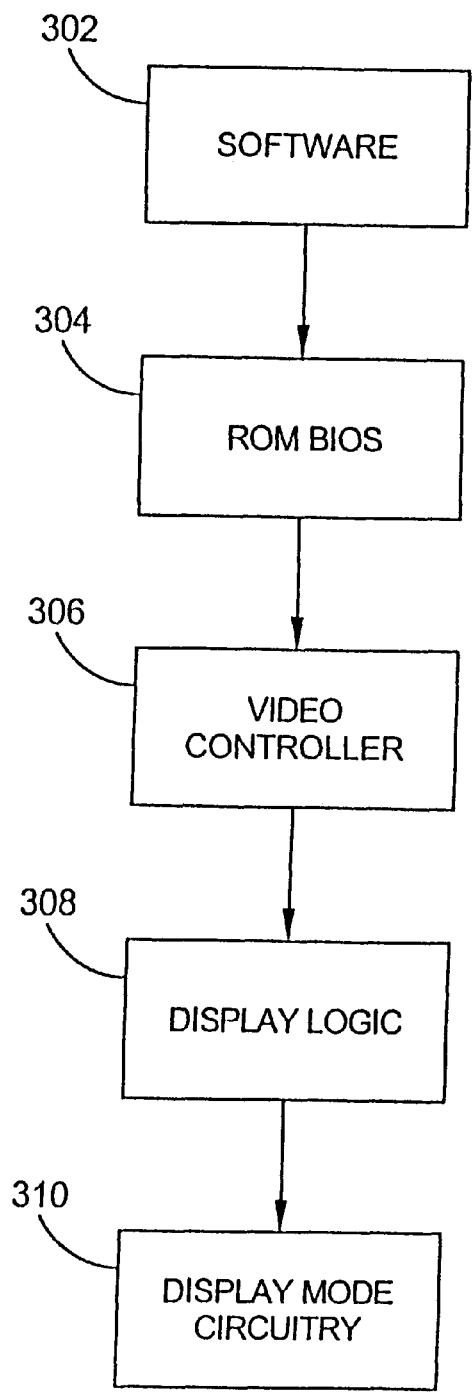
FIG. 3 is a block diagram of a preferred video display control system according to the present invention.

FIG. 3 shows a block diagram of a preferred video display control system according to the present invention. The present invention may be implemented in software 302 which may be tangibly embodied on a medium readable by a computer and capable of causing the computer to execute the method according to the present invention. Software 302 may be implemented as a part of or as an extension of an operating system or software application environment, such as an audiovisual control panel or the like, for example, of the type including controls for selection and playback of A/V sources and other A/V features.

Software 302 allows user input to select the desired operational mode of the display 114. In one embodiment, display mode selection may be made, for example, via a selection of an item in an on-screen menu such as a pull down menu or an otherwise user navigable menu or menu hierarchy. In addition to or as an alternative to an on-screen user interface, a keyboard or other input device (e.g., a pointing device) may be employed to provide user input for display mode selection, such as a special function key, button, or key combination on a keyboard or other input device. As yet a further additional or alternative input method, the user input may be obtained through a series of interactive prompts, such as a software "wizard" or the like to guide a user through the process of setting the display mode and optionally in making other settings such as channel or A/V source selection and so forth.

Upon receipt of a user input command to switch the display mode from the standard noninterlaced computer video display mode to the television mode (e.g., NTSC mode) or vice versa, software 302 initiates the mode change. In one embodiment, software 302 controls the video hardware by calling a command, service, or function in the VGA BIOS residing in the system ROM 304. In another embodiment, software 302 controls the video hardware directly rather than via the BIOS interface, as would be understood by those skilled in the art. The mode change command may be sent to the display microprocessor 308 via VGA controller 306, for example, via a bidirectional display data channel (DDC) interface. The microprocessor 308 acts on display circuitry 310 to change the display mode.

Figure 4:
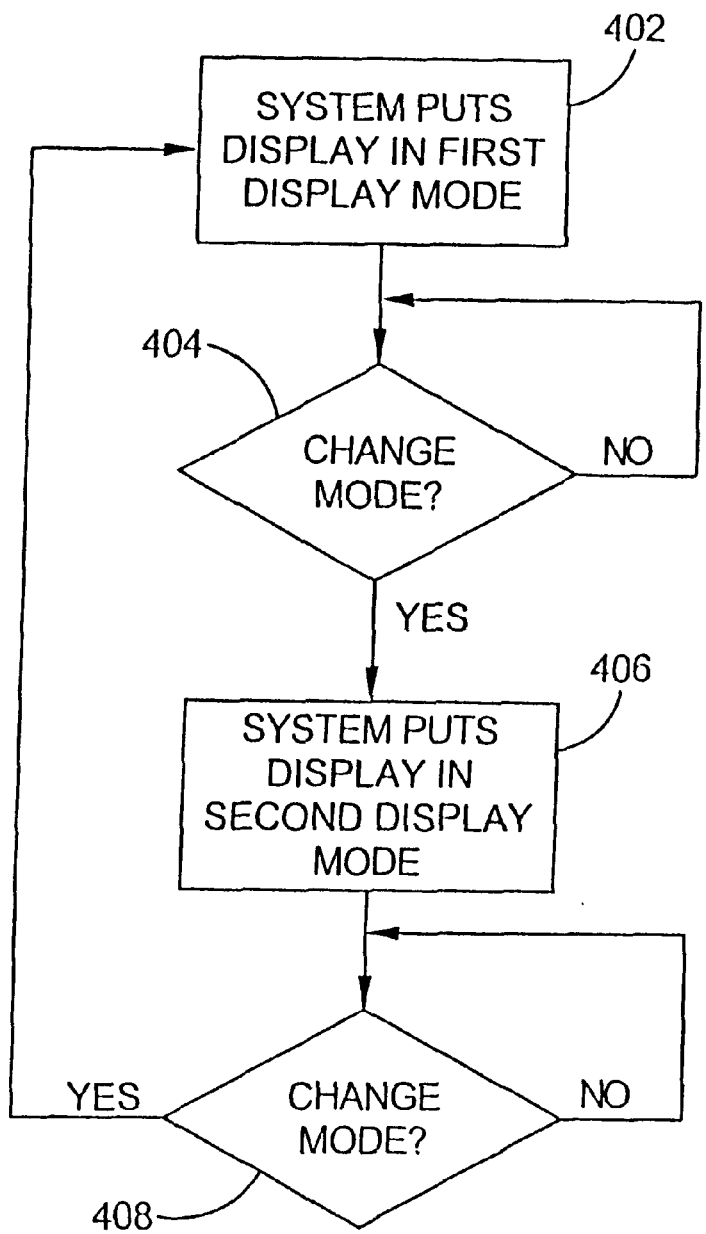
FIGS. 4 and 5 are flowcharts illustrating methods of operating the display system according to the present invention.

The flow chart of FIG. 4 illustrates a method according to the present invention for employing a host computer system to change the operational mode of a display between a first display mode which is one of a television mode and computer graphics mode (as defined above) and a second display mode, which is the other of a television mode and computer graphics mode. In step 402, the display is in the first display mode. Absent any user input changing the display mode in step 404, the process loops within the first display mode. Upon receiving user input to change the display mode, the host system sends a command over the DDC interface to put the system in the second display mode in step 406. The command is a DDC compatible command, i.e., a command that does not conflict with or otherwise interfere with any other DDC commands. The process then loops within the second display mode until user input is received in step 408 to change the display mode. In step 410, the system puts the display the first display mode.

In the process of FIG. 4, when the display mode is changed from the computer display mode to the television display mode, the video output from the video controller 202 (FIG. 2) may be stopped, or may continue to be output but not displayed by display 114. Display 114, however, will receive DDC commands from the host system regardless of whether the display is in the computer graphics mode or television mode. When the computer is changed from computer graphics mode to television mode, the display may be returned to the computer graphics mode by a number of methods. For example, in an embodiment, a keyboard or other input device (e.g., a key, function key, key combination, etc.) may be employed to return the display mode from television mode to computer graphics mode. This is advantageous in single monitor systems (i.e., where the display 114 is the only monitor in the system). In one embodiment, a dialog box may appear before the display is switched from computer graphics mode to television mode informing the user of the keystroke or other procedure for returning to the computer graphics mode. In this embodiment, optional "OK" and "Cancel" buttons may be provided, wherein the mode is changed only upon the user selecting "OK" and wherein the mode is not changed upon the user selecting "Cancel."

In a multiple monitor system, a second monitor may be employed to continue displaying the computer output while the display 114 is in television mode. In such a system, a user may use the same software interface used to change from computer graphics mode to television mode to change from television mode to computer graphics mode.

Figure 5:
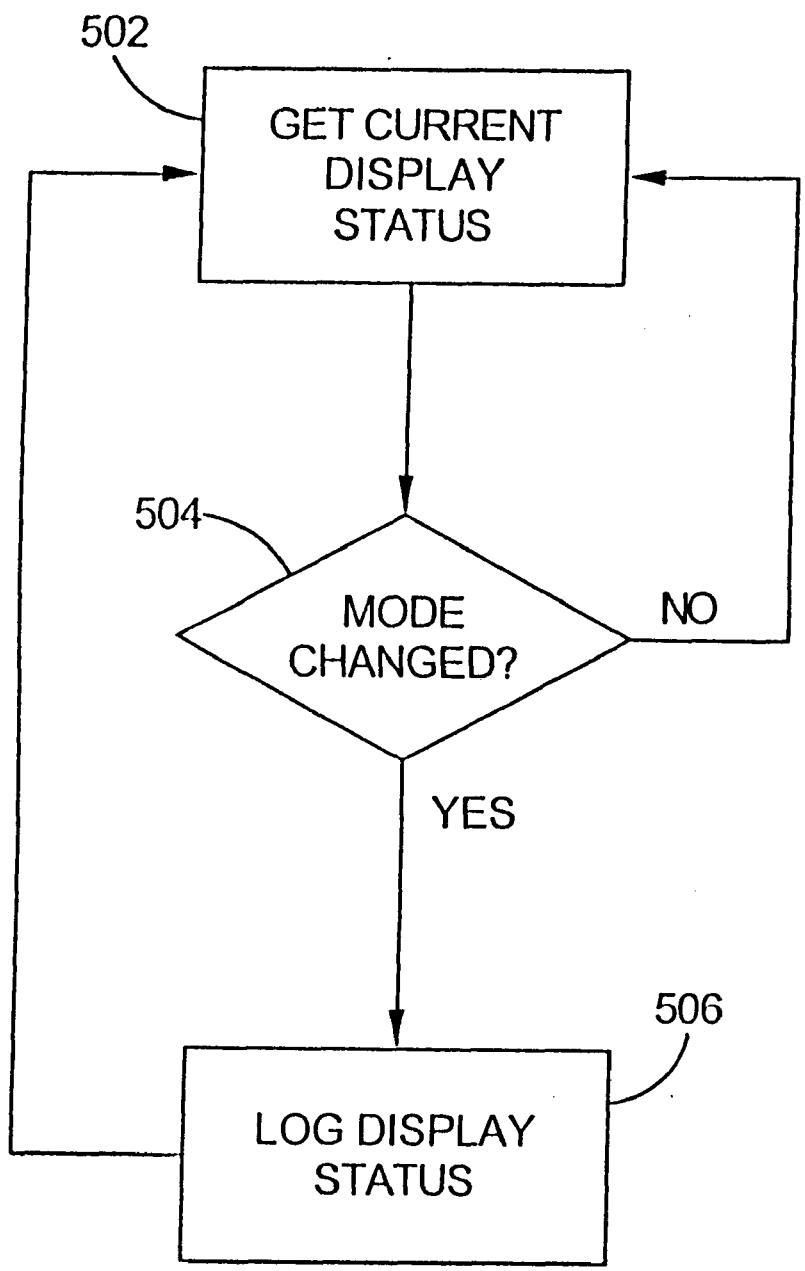

Yet another method for changing the display operational mode is by controlling display 114 directly, i.e., with manual controls such as front panel buttons, on-screen controls, or a television remote control device. FIG. 5 is a flow chart illustrating a method according to the present invention wherein the display mode is controllable by the host system, but where the display mode may also be changed via user input to the display directly, independently of the host system. In step 502 the display sends data indicating the current operational mode to the host system. The data may be sent periodically, in response to polling by the host system, in response to a change in the operational mode, and so forth. If the mode has not changed in step 504, the process returns to step 502. If the mode has changed in step 504, the mode change is logged in memory by the host system.

Figure 6:
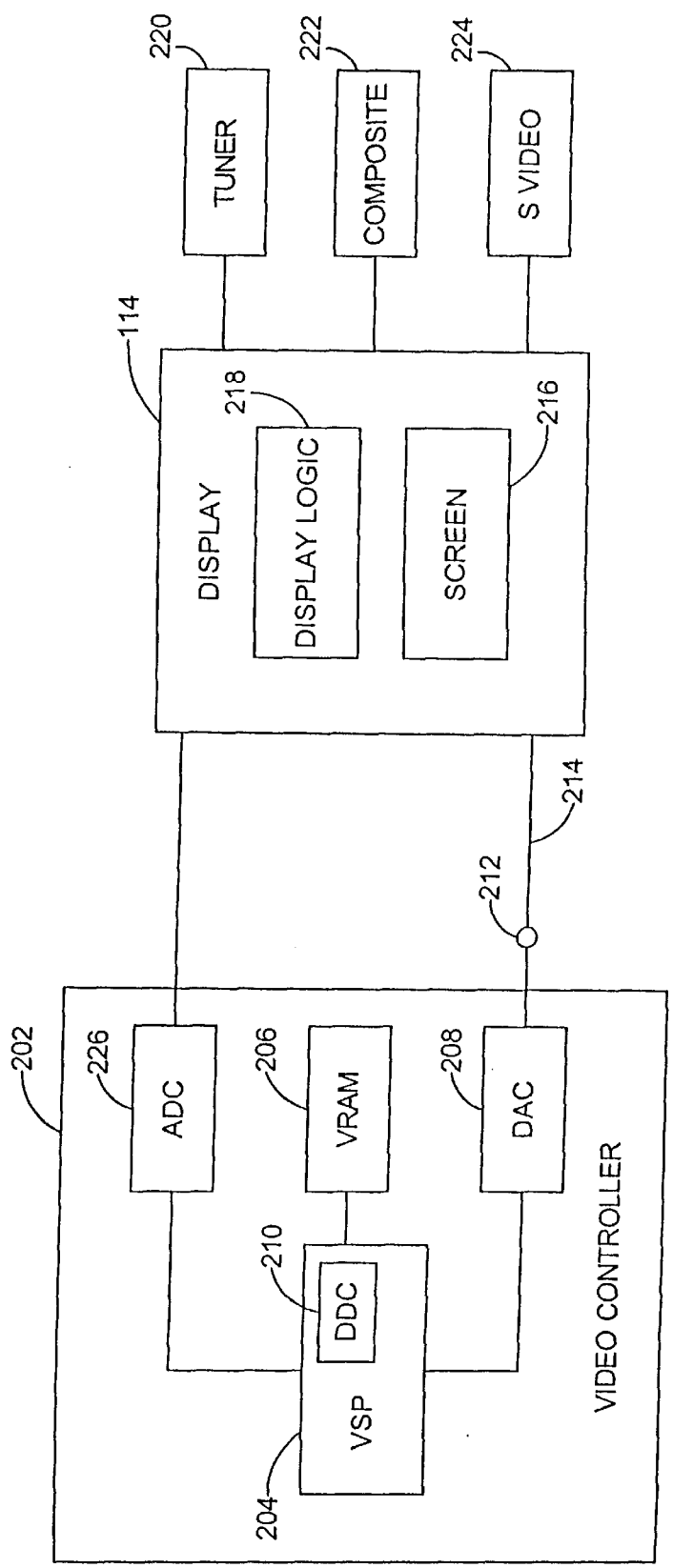
FIG. 6 is a block diagram illustrating an additional embodiment of a display apparatus according to the present invention.

Referring now to FIG. 6, there is shown a block diagram of a display apparatus according to a further embodiment of the present invention. Display 114 is a computer display device capable of conforming to both a computer display standard and a television display standard as described above by way of reference to FIG. 2. The display device 114 is used to multiplex a plurality of television inputs, such as tuner input 220, composite video source 222, S-video input 224 and so forth. When the display 114 is in the television operating mode, it functions like a television, outputting a full-screen display of the selected A/V source 220, 222, or 224.

When the display 114 is switched by a user to computer graphics mode, display 114 outputs an analog video signal, e.g., a composite or S-video signal, is sent from display 114 to video capture circuitry 226 comprising analog to digital converter (ADC) and associated video capture circuitry. The video capture circuitry may be located on the same circuit board as video controller 202 or may be located on a separate circuit board coupled to the system bus (e.g., PCI bus) 110 (FIG. 1). The analog video signal is converted to digital video data which may then displayed in an overlay window on screen 216 using VGA. In this manner, a user may receive and view the audiovisual content while also using the computer for other purposes or while viewing other information in computer graphics mode.

In one embodiment, the digital signal may be compressed using known intraframe and/or interframe compression/decompression (CODEC) techniques, and may be stored in memory device 106 (FIG. 1). Storage is preferably in a known video data format, including but not limited to, MPEG, MJPEG, AVI, DVI/RTV, Indeo Video formats, and the like.

The switching between the television mode and the computer graphics mode is controllable through the host computer system as described above. For example, a software interface may be provided to allow a user to transition the display between the computer graphics mode and the television mode using the host computer system. Alternative methods may also be provided for transitioning the display between the television and computer graphics mode, such as a remote control command, manual controls, keyboard input, and so forth, in the same manner as described above.

Figure 7:
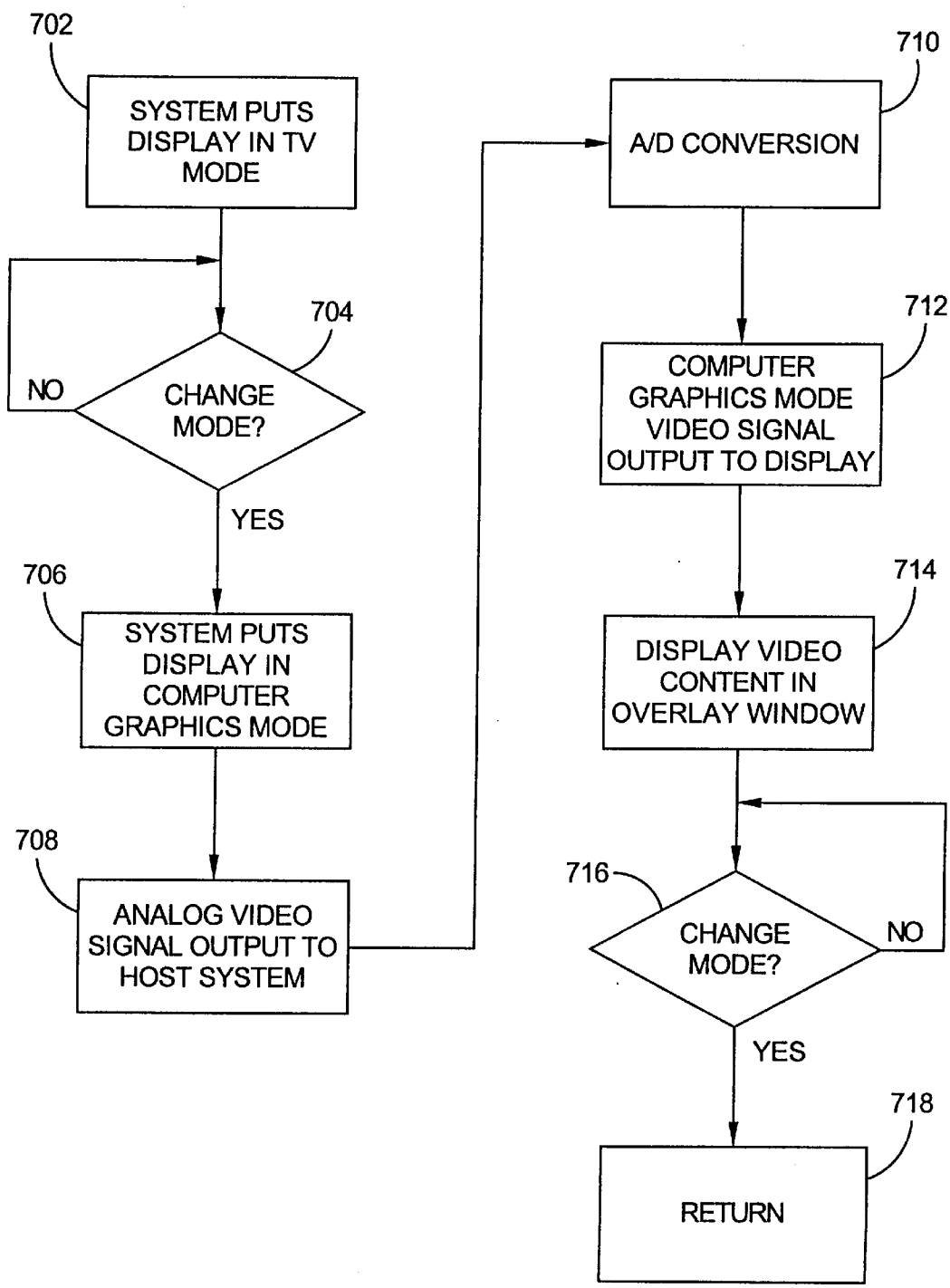
FIG. 7 is a flowchart illustrating a method of operating the display system according to the present invention.

FIG. 7 is a flow chart illustrating a method according to the present invention. In step 702, the display is put in television mode and displays audiovisual material from a selected audiovisual source such as analog video sources 220, 222, and 224 (FIG. 6). The process loops within the television mode in step 704 until user input is received changing the mode to the computer graphics mode. In television mode, the display behaves as a normal television and although the computer graphics output is not displayed, commands may still be sent over the DDC interface and the computer may be used to control television features (ANV source selection, changing channels, and so forth) while the display is in television mode. Upon receipt of user input changing the mode, a command is sent from the host system to the display via the DDC interface to change the display operational mode in step 706 and an analog video signal (e.g., composite, S-video) is output from the display to the host system in step 708. In step 710, the analog video signal is received by digitizing circuitry of the host computer system for digitization and processing. In step 712, the digitized audiovisual information is formatted and output as a part of the host system's computer graphics output (e.g., VGA, SVGA, and so forth). In step 714, the output signal containing the audiovisual content is displayed. In one embodiment, the audiovisual content appears in an on-screen overlay window. The process loops within the computer graphics mode in step 716 until a command is received changing the display mode from the computer graphics mode to the television mode. In step 718, upon receipt of a command changing the display mode, the process returns to step 702 and the audiovisual content is displayed in the standard full-screen, interlaced mode.

In one embodiment the display operational mode is by controlling display 114 directly, i.e., with front panel buttons or other manual controls, on-screen controls, or a remote control device. Where display mode selection may be made independently of the host system, the method shown and discussed above by way of reference to FIG. 5 may also be employed with the embodiments of FIGS. 6 and 7.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A display apparatus for use with a host computer system, the display apparatus comprising circuitry allowing an interlaced mode of operation and a noninterlaced mode of operation, the display apparatus comprising:

a screen, said screen operable to display visually detectable output from the host computer system when operating in the noninterlaced mode of operation and operable to display a television compatible signal when operating in the interlaced mode of operation;

a communication channel between said host computer system and said display apparatus, the communication channel for transmitting commands from said host computer system to said display apparatus; and a microprocessor for receiving commands from said host computer system, said microprocessor comprising control logic for switching said display apparatus between said interlaced and noninterlaced modes of operation in response to said commands;

wherein the host computer system and said display apparatus are connected via a multipin video connector having a plurality of spare pins and wherein said communication channel utilizes said spare pins.

2. A display apparatus for use with a host computer system, the display apparatus comprising circuitry allowing an interlaced mode of operation and a noninterlaced mode of operation, the display apparatus comprising:

a screen, said screen operable to display visually detectable output from the host computer system when operating in the noninterlaced mode of operation and operable to display a television compatible signal when operating in the interlaced mode of operation;

a communication channel between said host computer system and said display apparatus, the communication channel for transmitting commands from said host computer system to said display apparatus, wherein said communication channel is bidirectional; and a microprocessor for receiving commands from said host computer system, said microprocessor comprising control logic for switching said display apparatus between said interlaced and noninterlaced modes of operation in response to said commands.

3. A display apparatus for use with a host computer system, the display apparatus comprising circuitry allowing an interlaced mode of operation and a noninterlaced mode of operation, the display apparatus comprising:

a screen, said screen operable to display visually detectable output from the host computer system when operating in the noninterlaced mode of operation and operable to display a television compatible signal when operating in the interlaced mode of operation;

a communication channel between said host computer system and said display apparatus, the communication channel for transmitting commands from said host computer system to said display apparatus, wherein said communication channel is compatible with a Display Data Channel communication channel standard; and a microprocessor for receiving commands from said host computer system, said microprocessor comprising control logic for switching said display apparatus between said interlaced and noninterlaced modes of operation in response to said commands.

4. A computer system comprising:
a host computer system including:
   a processor;
   a memory coupled to said processor;
   a video controller coupled to said processor and said memory; and
   a display apparatus coupled to a video controller of the host computer system, the display apparatus comprising circuitry allowing an interlaced mode of operation and a noninterlaced mode of operation, the display apparatus comprising:
      a screen, said screen operable to display visually detectable output from the host computer system when operating in the noninterlaced mode of operation and operable to display a television compatible signal when operating in the interlaced mode of operation;
      a communication channel between said host computer system and said display apparatus, the communication channel for transmitting commands from said host computer system to said display apparatus; and
      a microprocessor for receiving commands from said host computer system, said microprocessor comprising control logic for switching said display apparatus between said interlaced and noninterlaced modes of operation in response to said commands
wherein the host computer system and said display apparatus are connected via a multipin video connector having a plurality of spare pins and wherein said communication channel utilizes said spare pins.

5. A computer system comprising:
a host computer system including:
   a processor;
   a memory coupled to said processor;
   a video controller coupled to said processor and said memory; and
   a display apparatus coupled to a video controller of the host computer system, the display apparatus comprising circuitry allowing an interlaced mode of operation and a noninterlaced mode of operation, the display apparatus comprising:
      a screen, said screen operable to display visually detectable output from the host computer system when operating in the noninterlaced mode of operation and operable to display a television compatible signal when operating in the interlaced mode of operation;
      a communication channel between said host computer system and said display apparatus, the communication channel for transmitting commands from said host computer system to said display apparatus, wherein said communication channel is bidirectional; and
      a microprocessor for receiving commands from said host computer system, said microprocessor comprising control logic for switching said display apparatus between said interlaced and noninterlaced modes of operation in response to said commands.

6. A computer system comprising:
a host computer system including:
   a processor;
   a memory coupled to said processor;
   a video controller coupled to said processor and said memory; and
   a display apparatus coupled to a video controller of the host computer system, the display apparatus comprising circuitry allowing an interlaced mode of operation and a noninterlaced mode of operation, the display apparatus comprising:
      a screen, said screen operable to display visually detectable output from the host computer system when operating in the noninterlaced mode of operation and operable to display a television compatible signal when operating in the interlaced mode of operation;
      a communication channel between said host computer system and said display apparatus, the communication channel for transmitting commands from said host computer system to said display apparatus, wherein said communication channel is compatible with a Display Data Channel communication channel standard; and
      a microprocessor for receiving commands from said host computer system, said microprocessor comprising control logic for switching said display apparatus between said interlaced and noninterlaced modes of operation in response to said commands.

7. A method of operating a computer system to control a display apparatus, the display apparatus coupled to a video controller of the computer system, said computer system and said display apparatus further coupled via a communication channel, the display apparatus comprising circuitry providing a first mode of operation and a second mode of operation, said first mode of operation being one of an interlaced mode of operation and a noninterlaced mode of operation and the second mode of operation being the other, said method comprising the steps of:
   operating the display in said first display mode;
   receiving user input to change the display mode from said first mode of operation to said second mode of operation;
   sending a mode change command to the display apparatus in response to said user input; and
   transitioning the display apparatus from said first mode of operation to said second mode of operation
   wherein the host computer system and said display apparatus are connected via a multipin video connector having a plurality of spare pins and wherein said communication channel utilizes said spare pins.

8. A method of operating a computer system to control a display apparatus, the display apparatus coupled to a video controller of the computer system, said computer system and said display apparatus further coupled via a communication channel, the display apparatus comprising circuitry providing a first mode of operation and a second mode of operation, said first mode of operation being one of an interlaced mode of operation and a noninterlaced mode of operation and the second mode of operation being the other, said method comprising the steps of:
   operating the display in said first display mode;
   receiving user input to change the display mode from said first mode of operation to said second mode of operation;
   sending a mode change command to the display apparatus in response to said user input; and
   transitioning the display apparatus from said first mode of operation to said second mode of operation;
   wherein said communication channel is bidirectional.

9. A method of operating a computer system to control a display apparatus, the display apparatus coupled to a video controller of the computer system, said computer system and said display apparatus further coupled via a communication channel, the display apparatus comprising circuitry providing a first mode of operation and a second mode of operation, said first mode of operation being one of an interlaced mode of operation and a noninterlaced mode of operation and the second mode of operation being the other, said method comprising the steps of:

operating the display in said first display mode;

receiving user input to change the display mode from said first mode of operation to said second mode of operation;

sending a mode change command to the display apparatus in response to said user input; and transitioning the display apparatus from said first mode of operation to said second mode of operation;

wherein said communication channel is compatible with a Display Data Channel communication channel standard.

10. A method of operating a computer system to control a display apparatus, the display apparatus coupled to a video controller of the computer system, said computer system and said display apparatus further coupled via a communication channel, the display apparatus comprising circuitry providing a first mode of operation and a second mode of operation, said first mode of operation being one of an interlaced mode of operation and a noninterlaced mode of operation and the second mode of operation being the other, said method comprising the steps of:

operating the display in said first display mode;

providing a user interface allowing the television to be switched from said first mode of operation to said second mode of operation independently of said host computer system;

receiving user input to change the display mode from said first mode of operation to said second mode of operation;

sending a mode change command to the display apparatus in response to said user input; and transitioning the display apparatus from said first mode of operation to said second mode of operation; and logging any changes via said user interface with the host computer system.

11. A computer system comprising:

a host computer system including:
  a processor;
  a memory coupled to said processor;
  a video controller coupled to said processor and said memory;
  digitizing circuitry for converting an analog video signal to digital information;

a display apparatus coupled to a video controller of the host computer system, the display apparatus comprising circuitry allowing an interlaced mode of operation and a noninterlaced mode of operation, the display apparatus comprising:
  a screen, said screen operable to display visually detectable output from the host computer system when operating in the noninterlaced mode of operation and operable to display a television compatible signal when operating in the interlaced mode of operation;
  circuitry to output an analog video signal to said host computer system;
  a microprocessor for receiving commands from said host computer system, said in microprocessor comprising control logic for switching said display apparatus between said interlaced and noninterlaced modes of operation in response to said commands; and a communication channel between said host computer system and said display apparatus, the communication channel for transmitting commands from said host computer system to said display apparatus;

wherein the host computer system and said display apparatus are connected via a multipin video connector having a plurality of spare pins and wherein said communication channel utilizes said spare pins.

12. A computer system comprising:

a host computer system including:
  a processor;
  a memory coupled to said processor;
  a video controller coupled to said processor and said memory;
  digitizing circuitry for converting an analog video signal to digital information;

a display apparatus coupled to a video controller of the host computer system, the display apparatus comprising circuitry allowing an interlaced mode of operation and a noninterlaced mode of operation, the display apparatus comprising:
  a screen, said screen operable to display visually detectable output from the host computer system when operating in the noninterlaced mode of operation and operable to display a television compatible signal when operating in the interlaced mode of operation;
  circuitry to output an analog video signal to said host computer system;
  a microprocessor for receiving commands from said host computer system, said microprocessor comprising control logic for switching said display apparatus between said interlaced and noninterlaced modes of operation in response to said commands; and a communication channel between said host computer system and said display apparatus, the communication channel for transmitting commands from said host computer system to said display apparatus, wherein said communication channel is bidirectional.

13. A computer system comprising:

a host computer system including:
  a processor;
  a memory coupled to said processor;
  a video controller coupled to said processor and said memory;
  digitizing circuitry for converting an analog video signal to digital information;

a display apparatus coupled to a video controller of the host computer system, the display apparatus comprising circuitry allowing an interlaced mode of operation and a noninterlaced mode of operation, the display apparatus comprising:
  a screen, said screen operable to display visually detectable output from the host computer system when operating in the noninterlaced mode of operation and operable to display a television compatible signal when operating in the interlaced mode of operation;
  circuitry to output an analog video signal to said host computer system;
  a microprocessor for receiving commands from said host computer system, said microprocessor comprising control logic for switching said display apparatus between said interlaced and noninterlaced modes of operation in response to said commands; and a communication channel between said host computer system and said display apparatus, the communication channel for transmitting commands from said host computer system to said display apparatus, wherein said communication channel is compatible with a Display Data Channel communication channel standard.

14. A method of operating a computer system to control a display apparatus, the display apparatus coupled to a video controller of the computer system, the display apparatus comprising circuitry providing an interlaced mode of operation and a noninterlaced mode of operation, said method comprising the steps of:

receiving an analog video signal, said analog video signal comprising interlaced, television compatible video content;

when said display apparatus is operating in said interlaced mode of operation, displaying said received analog signal to provide visually detectable interlaced video output; and when said display apparatus is operating in said noninterlaced mode of operation:

sending an analog video signal from said display apparatus to said computer system for analog to digital conversion, said analog video signal comprising interlaced, television compatible video content;

converting said analog video signal to a digital signal;

converting said digital signal to a noninterlaced, computer graphics mode compatible video signal; and outputting said computer graphics mode compatible signal to said display apparatus to provide visually detectable output.

15. A method of claim 14, wherein said interlaced mode of operation supports NTSC input.

16. A method of claim 14, wherein said noninterlaced mode of operation supports a computer graphics mode input.

17. A method of claim 16, wherein said noninterlaced mode of operation supports VGA input.

18. A method of claim 16, wherein said noninterlaced mode of operation supports SVGA input.

19. A method of claim 14, wherein said computer system and said display apparatus are further coupled via a communication channel.

20. A method of claim 19, wherein said communication channel is compatible with a Display Data Channel communication channel standard.

21. A method of operating a computer system to control a display apparatus, the display apparatus coupled to a video controller of the computer system, the display apparatus comprising circuitry providing an interlaced mode of operation and a noninterlaced mode of operation, said method comprising the steps of:

operating the display in said noninterlaced display mode;

sending an analog video signal from said display apparatus to said computer system for analog to digital conversion, said analog video signal comprising interlaced, television compatible video content;

converting said analog video signal to a digital signal;

converting said digital signal to a noninterlaced, computer graphics mode compatible video signal; and outputting said computer graphics mode compatible signal to said display apparatus to provide visually detectable output.

22. A method of claim 21, wherein said interlaced mode of operation supports NTSC input.

23. A method of claim 21, wherein said noninterlaced mode of operation supports a computer graphics mode input.

24. A method of claim 23, wherein said noninterlaced mode of operation supports VGA input.

25. A method of claim 23, wherein said noninterlaced mode of operation supports SVGA input.

26. A method of claim 23, wherein said computer system and said display apparatus are further coupled via a communication channel.

27. A method of claim 26, wherein said communication channel is compatible with a Display Data Channel communication channel standard.

* * * * *